United States Patent [19]

Kichak

[11] 3,996,506
[45] Dec. 7, 1976

[54] INRUSH CURRENT LIMITER

[75] Inventor: Robert A. Kichak, Greenbelt, Md.

[73] Assignee: The United States of America as represented by the United States National Aeronautics and Space Administration, Washington, D.C.

[22] Filed: Jan. 6, 1975

[21] Appl. No.: 538,982

[52] U.S. Cl. .................................. 321/13; 317/31
[51] Int. Cl.² .......................................... H02M 1/08
[58] Field of Search .................... 317/13 A, 16, 31; 321/2, 11, 12, 13, 14, 45 S; 323/9; 331/113 A

[56] References Cited
UNITED STATES PATENTS

| | | | |
|---|---|---|---|
| 2,968,739 | 1/1961 | Mohler | 321/2 X |
| 3,038,127 | 6/1962 | Wofford | 321/12 UX |
| 3,289,098 | 11/1966 | Cannalte | 321/45 S |
| 3,401,327 | 9/1968 | Leppert | 321/11 |

OTHER PUBLICATIONS

Duspiva, "Inverter Start Circuit", IBM Technical Disclosure Bulletin, vol. 17 No. 3 Aug. 1974, pp. 915, 916.

*Primary Examiner*—A. D. Pellinen
*Attorney, Agent, or Firm*—Robert F. Sandler; Gary F. Grafel; John R. Manning

[57] ABSTRACT

A circuit arrangement for limiting turn-on current inrush and current rate of rise in DC-to-DC power converters. A transistor control circuit is disposed between the input DC power source and the transistor oscillator circuit of the converter to provide a ramp of current thereto. The transistor control circuit functions as a time-variable current limiter initially while in the active region and as a saturated switch in the steady-state region. A feedback arrangement allows the saturation drive current to be provided from the converter at a lower voltage level than that which may be required from the DC power source to reduce dissipation and increase efficiency.

7 Claims, 2 Drawing Figures

INRUSH CURRENT LIMITER

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

1. Field of the Invention

The present invention is generally related to DC-to-DC power converters and, more particularly, is directed to circuitry for suppressing turn-on current transients of such power converters.

2. Description of the Prior Art

Unsuppressed turn-on current transients of DC-to-DC power converters can cause serious reliability problems in airborne or spacecraft DC power systems. Techniques presently utilized to limit current transients occuring at the initial application of power to a DC-to-DC converter include the placement of large inductors at the input to the converter to limit the rate of rise of the input current. One serious disadvantage of such a large input inductor is the size and weight of a component necessary to perform the job, which becomes particularly acute in high power spacecraft applications and the like. Further, energy stored in such an input inductor must be dissipated when the unit is turned off by means of a damper resistor or diode to prevent large voltage transients. The latter requirement further complicates the necessary circuitry and increases cost.

Another technique presently in use, as exemplified by prior U.S. Pat. No. 3,376,478 to Sheng et al, is known as an active voltage rate of rise circuit which provides a ramp input voltage to the converter circuit. Such circuits, while generally effective, do not guarantee a transient-free input current. This is particularly true in the case of self-oscillating converters with heavy loading wherein regenerative oscillation may not commence until a substantial percentage of the rated input voltage is supplied to the converter. When regenerative oscillation commences, the output capacitance of the converter charges rapidly to cause a current spike at the input terminals. Such a current surge will go unsuppressed in a prior art low impedance ramp voltage follower. That is, it is clear that current surges can exist even when the rate of rise of the input voltage is controlled, as in the prior art patent to Sheng et al. Accordingly, it is seen that a need exists for an effective, reliable and simple circuit for limiting current transients and current rate of rise upon the application of power to a DC-to-DC power converter.

OBJECTS AND SUMMARY OF THE INVENTION

It is therefore an object of the present invention to provide a simple, reliable and effective circuit for suppressing turn-on current transients of DC-to-DC power converters.

Another object of the present invention is to provide an electronic circuit for limiting current surges and the rate of rise of current in DC-to-DC power converters upon the initial application of power from a DC power source thereto.

An additional object of the present invention is to provide in a DC-to-DC power converter means for limiting the inrush current thereto upon the initial application of DC power which substantial weight, size and cost reductions over prior art techniques discussed hereinabove and further, which provides improved performance over the prior art voltage rate of rise circuits.

A still further object of the present invention is to provide in a DC-to-DC converter means for limiting current surges and the rate of current rise during the initial application of power to the converter by means of which an ideal, transient-free input current may be readily achieved.

The foregoing and other objects are attained in accordance with one aspect of the present invention through the provision of a control circuit connected between a DC power and source and a DC-to-DC converter for limiting current surges and the rate of current rise during the initial application of power to the converter from the DC power source. The current limiting means, in a preferred embodiment, comprises a control transistor whose collector and emitter are connected in series between the DC power source and the input to the converter. Control means are connected to the base of the control transistor for gradually increasing its conducting after the initial application of power from the DC power source. A timing circuit, including a capacitor, is connected in parallel with the DC power source for supplying a saturation current to the base of the control transistor via a pair of Darlington driver transistors after the timing capacitor has been fully charged from the DC power source. In order to limit the power necessary to maintain the control transistor in saturation, a feedback circuit is provided between the converter output and the control transistor for maintaining the latter in saturation after steady-state conditions are attained. Accordingly, the control transistor and associated circuitry functions as a time-variable current limiter in the active region and as a saturated switch in the steady-state region.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which.

DETAILED DESCRIPTION OF A PREFERRED EMBODIMENT

Figure 1:
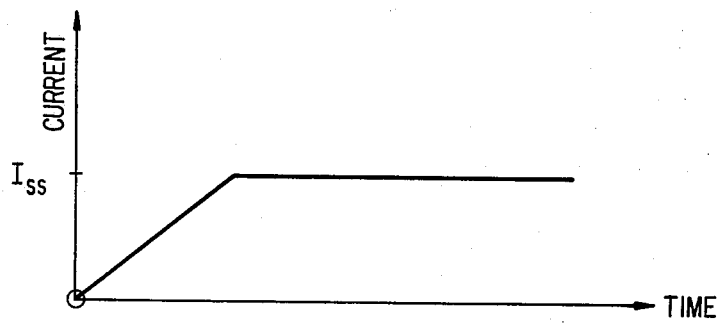
FIG. 1 is a graph illustrating an ideal transient-free input current desired to be achieved by the present invention.

Referring first to FIG. 1, there is shown a graph of an ideal transient-free input current desired to be supplied to a conventional DC-to-DC converter. The abscissa represents time, while the ordinate represents the current, $I_{ss}$ representing the steady-state value of the converter input current. Note in FIG. 1 the lack of transients or current surges and the steady rate of rise of the input current to the steady-state value.

Figure 2:
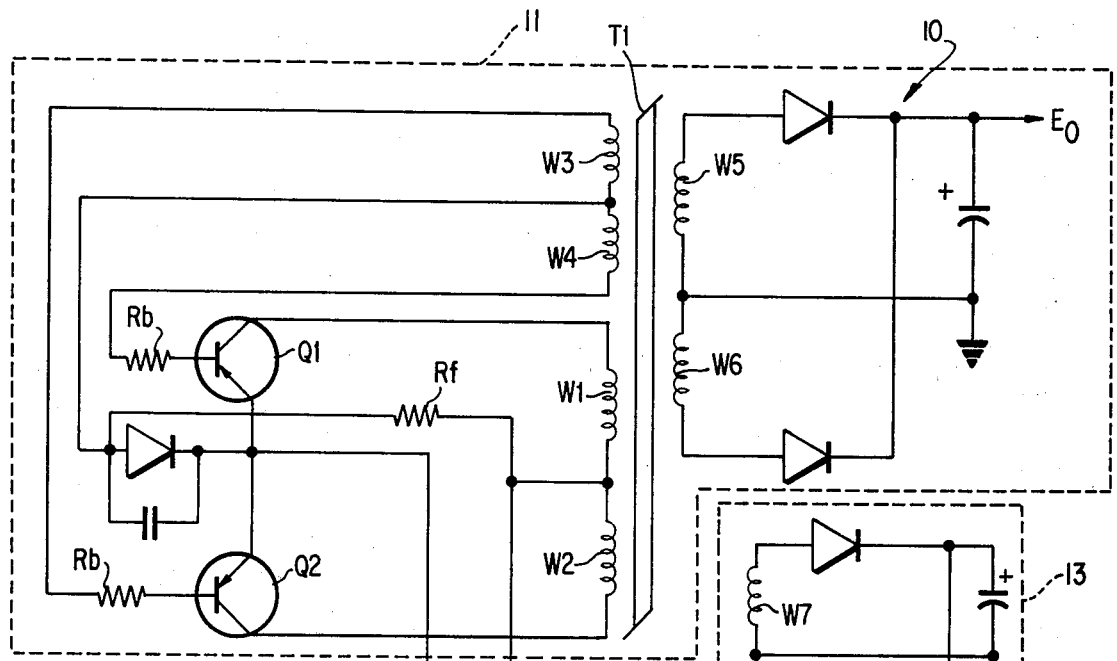
FIG. 2 is a schematic circuit diagram illustrating a preferred embodiment of the present invention for achieving the turn-on current characteristic depicted in FIG. 1.
Figure 2:
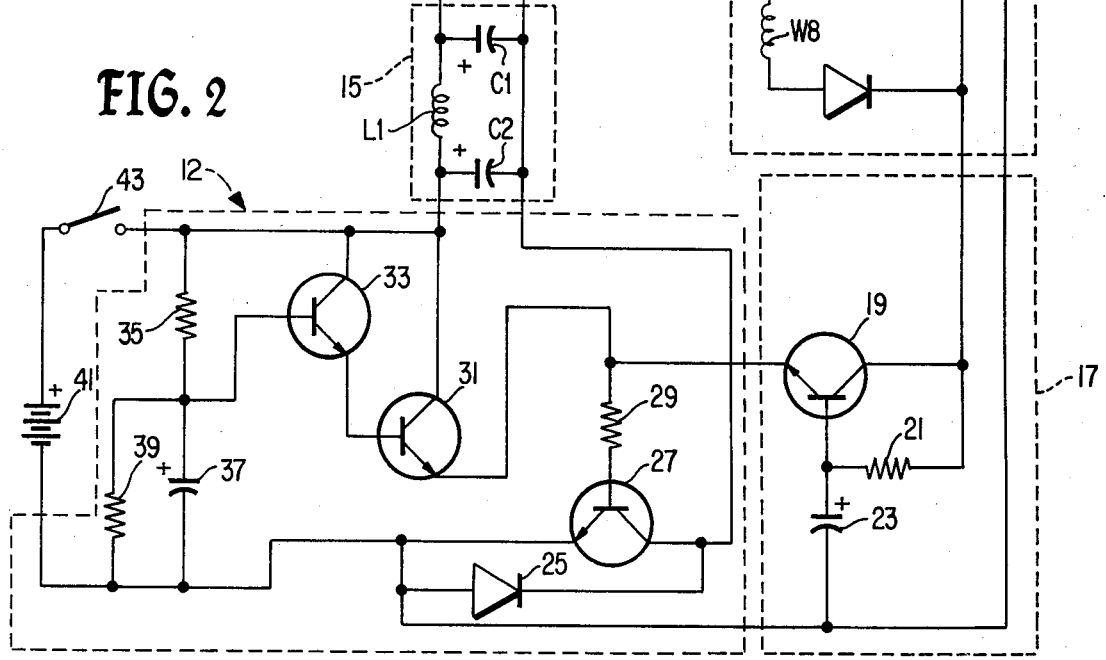

Referring now to FIG. 2, there is shown generally at 12 the active control circuit according to the present invention being connected to the input oscillating transistors Q1 and Q2 of a typical DC-to-DC power converter 11. Interposed between the active control circuit 12 and the converter 11 is an input ripple filter 15 consisting of a series of inductor L1 and parallel capacitors C1 and C2.

DC-to-DC power converter 11, as is well known in the art, consists essentially of a saturable core transformer T1 having a plurality of input windings W1 through W4 and a plurality of associated output windings W5 through W8. Transistors Q1 and Q2 are alternately at cutoff and saturation so as to provide a square wave output through output windings W5 and W6. The square wave alternating output is then rectified by an output rectifier circuit 10 to deliver a DC output $E_o$. Resistors $R_b$ and $R_f$ establish the initial starting bias required for the bases of transistors Q1 and Q2. The foregoing description is understood to comprise a conventional DC-to-DC power converter and is in no manner intended to be limiting as regards the spirit and scope of the present invention.

DC-to-DC power converter 11 is to be supplied with power from a DC voltage source, such as battery 41, through a turn-on switch 43 and input ripple filter 15. As explained hereinabove, upon closure of turn-on switch 43, a transient-free input current, such as that depicted in FIG. 1, is desired from DC power source 41.

Connected across power source 41 is a timing circuit/voltage divider comprising resistors 35 and 39 and capacitor 37. The base drive input to a pair of Darlington transistors 33 and 31 is connected to the junction of resistors 35, 39 and capacitor 37. The collectors of transistors 33 and 31 are coupled to the positive terminal of power source 41, while the negative terminal of power source 41 is connected via the emitter-collector junction of control transistor 27 to the ripple filter 15. The emitter of the first Darlington transistor 33 is direct coupled to the base of the succeeding Darlington transistor 31, the emitter of the latter being coupled through a base drive resistor 29 to the base of control transistor 27. The anode of a diode 25 is connected to the emitter of control transistor 27, while the cathode thereof is connected to the collector of transistor 27.

In operation, when switch 43 is initially closed, the voltage timing capacitor 37 is zero. No current will therefore be supplied to the Darlington driver transistors 33 and 31 nor to the control transistors 27. Input current drawn from power source 41 will be very low, as limited by divider resistor 35. The voltage across base resistor 29, which is determinative of the drive current to series transistor 27, will equal the voltage at the base of driver transistor 33 less the base-emitter drops of transistors 31, 33, and 27.

Timing capaciator 37 is charged slowly through divider resistor 35. Hence, the voltage across base resistor 29, and thus the drive current to control transistor 27, will slowly increase from zero to the saturation value. The ohmic values of divider resistors 35 and 39 and base resistor 29 should preferably be chosen such that when timing capacitor 37 is fully charged, a saturation drive current will be supplied to control transistor 27.

Accordingly, since control transistor 27 is gain-limited in its active region, the circuit will function as a time-variable current limiter in the active region of transistor 27, which will act also as a saturated switch in its steady-state region, in accordance with the preferred input current characteristics seen in FIG. 1.

For a slow rate of rise, the power converter 11 will begin regenerative oscillation while control transistor 27 is in its active, gain-limited region. Thus, any inrush current required to charge the output capacitance of the converter must be supplied from ripple filter 15 rather than from a voltage source 41. It is further seen that in this mode, the current required to saturate control transistor 27 is supplied through the collector-emitter junctions of Darlington driver transistors 31 and 33 from source voltage 41. If the source voltage from power source 41 is high, considerable power may be required to maintain control transistor 27 in saturation. Thus, in accordance with a further aspect of the present invention, a ramp follower circuit 17 in conjunction with an auxiliary isolated DC output circuit 13 act so as to supply saturation current from converter 11 to transistor 27 at a lower voltage level in order to reduce dissipation, as explained in more detail below.

The auxiliary isolated DC output circuit 13 is connected to receive the output from a pair of transformer output windings W7 and W8. A ramp voltage follower circuit 17 consists of a voltage follower transistor 19 whose collector is connected to the rectified output of circuit 13 as is its base via a timing capacitor 23. Connected between the base and collector of transistor 19 is a drive resistor 21. The emitter of voltage follower transistor 19 is connected to the junction between base resistor 29 and the emitter of drive transistor 31. The effect of ramp follower circuit 17 is to supply a slow-rising low voltage to base resistor 29 and control transistor 27 from the power converter auxiliary source 13.

In operation, the base emitter junction of transistor 19 will be reverse biased by the voltage across base resistor 29 and the voltage across the base-emitter junction of control transistor 27 due to the DC voltage source 41. The reverse bias across the base-emitter junction of transistor 19 will continue until the voltage across timing capacitor 23 rises to a value just sufficient to apply a forward bias thereto. Thereafter, the voltage across base resistor 29 and the base-emitter junction of control transistor 27 will rise to a higher value to thereby provide a greater saturation drive current to control transistor 27 and further to reverse bias the base-emitter junctions of the Darlington driver transistors 31 and 33. Accordingly, the sauration drive current from the DC voltage source 41 through driver transistors 31 and 33 will cease, and control transistor 27 will be maintained in saturation by a lower voltage as supplied by the feedback circuit from converter 11.

Diode 25 is placed across the collector-emitter junction of transistor 27 to protect same against voltage reversals which may occur if the input terminals are accidentally shorted while energy is stored in ripple filter 15. Thermal compensation is inherently provided since the base-emitter diode of transistor 19 and rectifier diodes in the auxiliary supply 13 tend to cancel the base-emitter diodes of driver transistors 31 and 33.

It is seen by virtue of the foregoing that by means of the circuitry of the present invention the saturation of control transistor 27 is virtually assured. Further, the converter-supplied current from circuits 13 and 17 will always shut off the saturation current supplied by driver transistors 31 and 33 to thereby limit dissipation and provide greater efficiency in operation. Further, the circuit according to the present invention provides substantial improvements over prior art current limiting techniques insofar as weight, size, cost, and performance is concerned. Power consumption of the active circuit is kept to a minimum since control transistor 47 is saturated in normal steady-state operation.

Obviously, numerous modifications and variations of the present invention are possible in light of the above teachings. For example, a single drive transistor could be provided in lieu of Darlington pair 31 and 33 in the case of low power converters. Further, for low input voltage converters, auxiliary converter source 13 and ramp follower circuit 17 may be omitted. It is therefore to be understood that within the scope of the appended claims, the invention may be practiced otherwise than as specifically described herein.

What is claimed as new and desired to be secured by letters patent of the United States is:

1. In a converter which includes a transformer having a plurality of input and output windings, a transistor oscillator circuit whose output is coupled to a pair of said input windings, a DC power source for energizing said transistor oscillator circuit, the circuit improvement which comprises:

active control circuit means connected between said DC power source and the input to said transistor oscillator circuit for substantially limiting current surges and the rate of current rise during the initial application of power to said transistor oscillator circuit from said DC power source, said active control circuit current limiting means comprising a control transistor whose collector and emitter are connecteed in series between said DC power source and said transistor oscillator circuit input and control means connected to the base of said control transistor for gradually increasing the conduction of said control transistor after the initial application of power from said DC power source, said control means including a timing circuit further including a capaciator connected in parallel with said DC power source and a pair of Darlington driver transistors.

2. The circuit according to claim 1 wherein said timing circuit further comprises a resistor connected across the collector-base junction of said Darlington driver transistor pair.

3. The circuit according to claim 2, wherein the output emitter of said Darlington driver transistor pair is coupled to the base of said control transistor through a drive resistor.

4. The circuit according to claim 3 further comprising feedback means connected between a pair of said output windings of said transformer and said control transistor for maintaining the latter in saturation after steady-state conditions are attained.

5. The circuit according to claim 4, wherein said feedback means includes an output rectifier circuit connected to said second pair of output windings and a second transistor whose collector-base junction is connected to receive the output from said output rectifier circuit and whose emitter is connected to the base of said control transistor through said drive resistor.

6. The circuit according to claim 5, further comprising a second drive resistor connected across the collector-base junction of said second transistor and a timing capacitor connected between the base of said second transistor and said output of said output rectifier circuit.

7. The circuit according to claim 6, further comprising a diode whose anode and cathode are respectively connected across the emitter and collector of said control transistor to protect the latter from accidental voltage reversals.

* * * * *